Patented Aug. 7, 1945

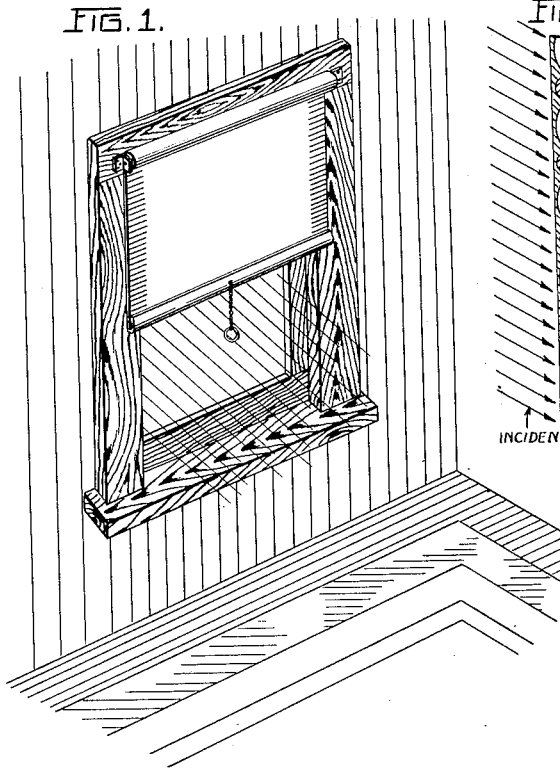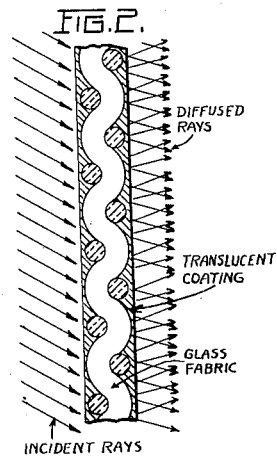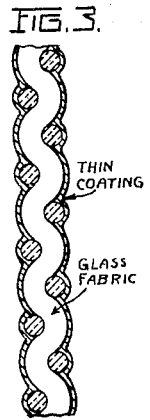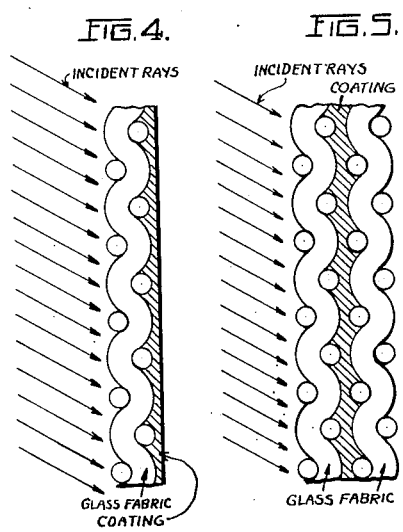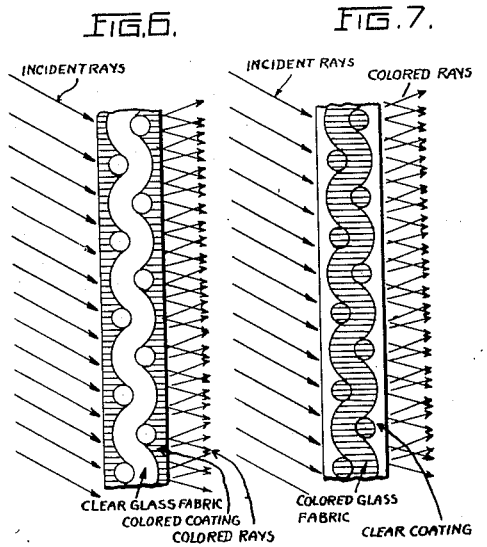

2,381,542

UNITED STATES PATENT OFFICE 2,381,542

COATED GLASS FIBER WINDOW SHADE

Charles S. Hyatt and Thomas J. Kerr, Columbus, Ohio, assignors to Columbus Coated Fabrics Corporation, Columbus, Ohio, a corporation of Ohio Application December 2, 1940, Serial No. 368,209

4 Claims. (Cl. 154—46)

This invention relates to window shade cloth and method of manufacture, and more particularly to coated glass fabric window shades.

It is an object of this invention to provide an improved coated fabric shade cloth which is highly resistant to deterioration by the action of sunlight, water, heat and cold.

Another object of this invention is to provide an improved window shade cloth comprising as a base interlaced glass fibers or equivalent prefused inorganic material in the form of filaments interlocked together and having a plastic coating composition applied thereto to produce a durable shade cloth product.

Another object is to provide a substantially transparent window shade cloth which is economical to produce and is very durable.

Another object is to produce a coated artificial fabric shade cloth material which is formed from woven or matted fiber glass filaments to which is anchored a plastic coating composition.

These and other objects and advantages will be apparent from the following description taken in connection with the drawing, wherein Figure 1 illustrates pictorially window shades made of coated fiber glass cloth according to this invention;

Figure 2 is an enlarged sectional view through a portion of the shade cloth and illustrating the diffusion of light rays incident thereto;

Figure 3 is a similar enlarged sectional view through a portion of the cloth illustrating the application of a very thin coating to a base fiber glass cloth material;

Figures 4 and 5 are like views illustrating the application of a coating to only one surface of the glass fabric, and in Figure 5 a sandwich type shade cloth construction is illustrated wherein the adhesive coating is applied between two layers of glass cloth fabric;

Figure 6 is a similar view as Figure 2 depicting the use of a colored coating for producing different color effects;

Figure 7 illustrates another modification of shade cloth construction wherein the base fiber glass cloth is formed of colored glass filaments or fibers while the coating applied thereto is substantially colorless.

In general, the service life of coated cloth window shades made heretofore utilizing a reinforcing base comprising the fibers or threads of cellulose, animal, or other organic material, is determined by the amount of sunlight which is allowed to penetrate to the fiber base. A shade cloth that is coated with a substantially opaque coating will last for several years, but the present tendency is to have transparent window shades which will permit a large amount of light to pass through the shade into a room or compartment when the shades are drawn. In the construction of transparent window shades there is less protection afforded to the fiber base cloth and the actinic rays of the sun are not absorbed in the coating so that the fiber base material is subjected to attack which results in bringing about disintegration of the organic fibers and ultimate failure of the shade cloth.

Further, in the manufacture of this type of transparent shade material, it is necessary to thoroughly bleach the cloth before applying the coating and this weakens the fibers and accelerates their failure in use. Moreover, it is difficult to remove all of the bleaching solution or chemical reagents used in treating the cloth so that the presence of these substances results in bringing about an early disintegration of the fiber base, as well as attacking the coating, shortening the life of the shade cloth.

These disadvantages are eliminated by the improved shade cloth made according to this invention wherein the woven or matted fiber glass is utilized in place of the conventional cotton and other cellulose type fibers for forming the reinforcing base material to which the coating is applied. In the use of glass cloth, no bleaching or chemical treatment of the fiber is necessary and where it is desired to chemically clean the glass fibers, this is readily effected and the chemical substances used are easily removed since the glass filaments are substantially non-porous and, therefore, do not absorb the chemicals making it possible to completely remove all the chemical treating material.

By utilizing glass fibers, a shade cloth can be made which is even more transparent than is now practical where cellulose or cotton base fiber material is used and, in addition, the shade cloth made of coated glass filaments possesses unexpectedy higher resistance to the deteriorating action of sunlight, water and atmospheric conditions to which the shade cloth is subjected in service, and a shade cloth is provided which can be washed and thoroughly cleaned without injuring the fibrous base reinforcing material.

Window shade cloth made according to this invention preferably comprises woven glass fabric to which is applied an adhesive plastic coating composition in any suitable manner, such as by dipping, spraying, flow coating, knife coating, roller coating, or the like. The coated fabric material is then force air dried or heated at temperatures sufficient to dry off the volatile ingredients and produce a dry, tough, flexible shade cloth. The baking time varies with the type of coating.

As typical examples of lacquer coating compositions used in the manufacture of window shades the following are given:

*Example I*

| | Parts by weight |
|---|---|
| Nitrocellulose (30-40 sec.) | 10.0 |
| Ethyl acetate | 18.0 |
| Alcohol | 14.0 |
| Toluol | 8.0 |
| Zinc oxide | 10.0 |
| Raw castor oil | 5.0 |
| Dibutyl phthalate | 2.5 |

*Example II*

| | Parts by weight |
|---|---|
| Nitrocellulose (30-40 sec.) | 6 |
| Ethyl cellulose (180 C. P. S.) | 4 |
| Ethyl acetate | 11 |
| Alcohol | 12 |
| Toluol | 18 |
| Zinc oxide | 6 |
| Raw castor oil | 4 |
| Dibutyl phthalate | 2 |

*Example III*

| | Parts by weight |
|---|---|
| Cellulose acetate | 5 |
| Acetone | 20 |
| Methyl-phthalyl-ethyl glycolate | 4 |
| Zinc oxide | 4 |

*Example IV*

| | Parts by weight |
|---|---|
| Cellulose acetate butyrate | 10 |
| Ethyl acetate | 40 |
| Zinc oxide | 6 |
| Raw castor oil | 3 |
| Dibutyl phthalate | 2 |

In preparing the coating compositions of the examples, the cellulose derivative film forming constituents are dissolved in the solvent and then incorporated with the pigment and plasticizer in the usual manner of making cellulose lacquers. The pigment is ground or thoroughly dispersed in the liquid ingredients of the coated composition.

In the examples, cellulose type lacquer formulations are described and are preferred. However, it is to be understood that other suitable coating compositions made from drying oils, synthetic resins, chlorinated rubber, or combinations of these, can be used as the coating for the glass fiber cloth. Zinc oxide is a preferred pigment in making white shade cloth, but other white pigments may be substituted, such as titanium oxide and the like. Further, where different colored coatings are desired, various combinations of pigments may be employed. Where a clear lacquer coating is required, the pigment may be omitted from the formulations given in the examples.

Preferably, an initial coating is applied over the glass fibers to give a slight penetration between the openings of the threads of the fibers forming a mechanical bond between the glass fibers over which additional coatings may be applied forming a coated glass cloth shade wherein the coating is thoroughly anchored to the fibers or filaments forming the base.

The cellulose derivative lacquer coatings given in the examples may be baked at a temperature of between 200 to 300 degrees F. The various coating compositions preferably are applied directly to the glass fibers which have been felted or woven in the form of a sheet or web. The adherence of the initial anchor coating to the glass fibers, however, may be enhanced if the surfaces of the glass fibers have been previously chemically cleaned to remove all the foreign substances, such as grease, moisture, and the like, so as to provide chemically clean glass fibers.

As illustrated in the drawing, various embodiments of this invention may be made, as shown in Figures 2 to 7. In Figures 2 and 3 the glass fiber base cloth is coated with a translucent coating composition. In Figure 3 a very thin anchor coating is applied to the glass fabric base material, while in Figure 4 a plastic coating is applied only to one side of the glass fabric. In this instance, the glass fabric may be exposed to the incident rays of light and the glass fibers forming the fabric will absorb the actinic rays of the sun giving greater protection to the coating. In Figure 5 a sandwich type shade cloth is illustrated wherein the adhesive coating material is applied in between two layers of glass fabric cloth. This type of construction gives greater protection to the coating since it is not exposed directly to the incident rays of sunlight.

The shade cloth product shown in Figure 6 illustrates the application of a colored coating to the glass fabric cloth base, while in Figure 7 a shade cloth is depicted wherein the glass fiber cloth base is made of colored glass and a clear coating is applied over this colored base material to form the shade. These two types of shade cloth construction illustrate two different ways of providing colored window shade products.

In the use of the improved window shade cloth products, it has been demonstrated by comparative tests that shade cloth material made according to this invention has markedly increased durability as compared with similar shade cloth made with cotton base fabric.

The unexpected improvements in the shade cloth products made as herein described are not accounted for merely by the substitution of glass fiber cloth for cotton or other textile material, since tests indicate that there is a chemical co-operation between the glass fiber and coating which retards the oxidation and aging of the coating. This results in prolonging the flexibility of the coating and greatly increases the useful life of the shade cloth. Further, due to the substantially non-stretching of the glass fabric base and its lower co-efficient of expansion, the coating is not subjected to distortion due to setting up of internal stresses, such as in the case of organic and cellulose fiber base materials which stretch considerably when placed under tension.

It will be understood that this invention is not limited to the particular formulations and examples illustrated but that various modifications may be made in the construction and coating composition used in making the coated glass fiber shade cloth by those skilled in the art without departing from the scope of this invention.

Having thus fully described our invention, what we claim as new and desire to secure by Letters Patent is:

1. Window shade cloth comprising a plurality of glass fiber webs bonded together by a flexible adhesive coating composition, said composition being baked-on and consisting before baking of at least one film forming constituent selected from the group consisting of nitrocellulose, ethyl cellulose, cellulose acetate and cellulose acetate butyrate, pigment and plasticizer.

2. Window shade cloth consisting of a colored glass fiber base coated with a substantially colorless coating composition comprising as the film forming ingredient at least one cellulose derivative selected from the group consisting of nitrocellulose, ethyl cellulose, cellulose acetate and cellulose acetate butyrate and plasticizer.

3. Window shade cloth consisting of a plurality of glass fiber webs coated with a coating composition comprising as the film forming ingredient at least one cellulose derivative selected from the group consisting of nitrocellulose, ethyl cellulose, cellulose acetate and cellulose acetate butyrate, pigment and plasticizer.

4. Window shade cloth consisting of a plurality of glass fiber webs coated with a substantially colorless coating composition comprising as the film forming ingredient at least one cellulose derivative selected from the group consisting of nitrocellulose, ethyl cellulose, cellulose acetate and cellulose acetate butyrate and plasticizer, said coating being adapted to bind together the several webs of glass fiber and being further baked-on.

CHARLES S. HYATT.
THOMAS J. KERR.